United States Patent
Branson et al.

(10) Patent No.: US 9,986,002 B2
(45) Date of Patent: *May 29, 2018

(54) MULTIFUSION OF A STREAM OPERATOR IN A STREAMING APPLICATION

(71) Applicant: International Business Machines Corporation, Armonk, NY (US)

(72) Inventors: Michael J. Branson, Rochester, MN (US); John M. Santosuosso, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/465,865

(22) Filed: Mar. 22, 2017

(65) Prior Publication Data

US 2017/0195383 A1    Jul. 6, 2017

Related U.S. Application Data

(63) Continuation of application No. 14/584,445, filed on Dec. 29, 2014, now Pat. No. 9,680,718, which is a
(Continued)

(51) Int. Cl.
*H04L 29/06* (2006.01)
*H04L 12/26* (2006.01)
(Continued)

(52) U.S. Cl.
CPC ...... *H04L 65/4069* (2013.01); *G06F 11/0709* (2013.01); *G06F 11/0751* (2013.01);
(Continued)

(58) Field of Classification Search
CPC ..... H04L 43/16; H04L 43/06; H04L 65/4069; H04L 65/602; H04L 12/26; H04L 29/06;
(Continued)

(56) References Cited

U.S. PATENT DOCUMENTS 6,745,384 B1    6/2004   Biggerstaff
7,613,848 B2    11/2009  Amini et al.
(Continued)

FOREIGN PATENT DOCUMENTS

WO    2013153027 A1    10/2013

OTHER PUBLICATIONS

Don Carney et al., Operator Scheduling in a Data Stream Manager, Proceedings of the 29th VLDB Conference, Berlin, Germany, 2003.*
(Continued)

*Primary Examiner* — Kamal B Divecha
*Assistant Examiner* — Clifton Houston
(74) *Attorney, Agent, or Firm* — Nathan M. Rau

(57) ABSTRACT

Embodiments of the present disclosure include a method, a system, and a computer program product for fusing a stream operator into more than one processing element within a streaming application. The method includes receiving an instruction to concurrently fuse, into a second processing element, a stream operator of interest that is fused into a first processing element. The method includes determining whether the stream operator of interest is stateful. The method includes compiling, in response to determining the stream operator of interest is stateful, a clone of the stream operator of interest into the second processing element so that the clone is synchronized with the stream operator of interest.

4 Claims, 9 Drawing Sheets

Related U.S. Application Data continuation of application No. 14/276,015, filed on May 13, 2014, now Pat. No. 9,614,740.

(51) Int. Cl.
| | | |
|---|---|---|
| *G06F 11/07* | (2006.01) | |
| *G06F 11/30* | (2006.01) | |
| *G06F 11/34* | (2006.01) | |
| *G06F 17/30* | (2006.01) | |

(52) U.S. Cl.
CPC ...... *G06F 11/0793* (2013.01); *G06F 11/3006* (2013.01); *G06F 11/3409* (2013.01); *H04L 43/04* (2013.01); *H04L 43/06* (2013.01); *H04L 43/0811* (2013.01); *H04L 43/16* (2013.01); *G06F 17/30516* (2013.01); *G06F 17/30575* (2013.01); *H04L 65/601* (2013.01)

(58) Field of Classification Search
CPC ... H04L 65/601; H04L 43/0811; H04L 65/60; H04L 43/04; G06F 17/30516; G06F 17/30575; G06F 11/3409; G06F 11/0709; G06F 11/3006; G06F 11/0751; G06F 11/0793
See application file for complete search history.

(56) References Cited

U.S. PATENT DOCUMENTS

| | | | |
|---|---|---|---|
| 8,095,690 B2 | 1/2012 | Kashiyama et al. | |
| 8,201,171 B2 | 6/2012 | Duffy et al. | |
| 8,407,360 B2 | 3/2013 | Andrade et al. | |
| 8,490,072 B2 | 7/2013 | Andrade et al. | |
| 9,135,057 B2* | 9/2015 | Branson | G06F 9/48 |
| 9,146,775 B2* | 9/2015 | Branson | G06F 9/48 |
| 9,473,550 B2 | 10/2016 | Branson et al. | |
| 2010/0293532 A1* | 11/2010 | Andrade | G06F 11/1438 |
| | | | 717/140 |
| 2010/0325621 A1* | 12/2010 | Andrade | G06F 8/433 |
| | | | 717/156 |
| 2011/0295939 A1* | 12/2011 | Andrade | G06F 9/548 |
| | | | 709/203 |
| 2012/0066184 A1* | 3/2012 | Barsness | G06F 17/30516 |
| | | | 707/687 |
| 2012/0137178 A1* | 5/2012 | Barsness | G06F 11/362 |
| | | | 714/35 |
| 2012/0179809 A1* | 7/2012 | Barsness | G06F 17/30516 |
| | | | 709/224 |
| 2012/0218268 A1 | 8/2012 | Accola et al. | |
| 2012/0311172 A1* | 12/2012 | Branson | H04L 65/60 |
| | | | 709/231 |
| 2012/0331333 A1 | 12/2012 | Imaki | |
| 2013/0054779 A1* | 2/2013 | Cradick | G06F 15/173 |
| | | | 709/224 |
| 2013/0145121 A1 | 6/2013 | Fawcett | |
| 2013/0166942 A1 | 6/2013 | Branson et al. | |
| 2013/0198318 A1* | 8/2013 | Branson | G06F 9/44 |
| | | | 709/217 |
| 2013/0198489 A1* | 8/2013 | Branson | G06F 9/44 |
| | | | 712/200 |
| 2013/0290969 A1* | 10/2013 | Branson | G06F 9/48 |
| | | | 718/102 |
| 2014/0156683 A1* | 6/2014 | de Castro Alves | |
| | | | G06F 17/30516 |
| | | | 707/755 |
| 2014/0173247 A1* | 6/2014 | Litovtchenko | G06F 1/12 |
| | | | 712/29 |
| 2015/0334143 A1 | 11/2015 | Branson et al. | |
| 2015/0334148 A1 | 11/2015 | Branson et al. | |

OTHER PUBLICATIONS

Nesime Tatbul et al., Load Shedding in a Data Stream Manager, Proceedings of the 29th VLDB Conference, Berlin, Germany, 2003.*

Emine Nesime Tatbul, Load Shedding for Data Stream Management Systems, Thesis/Dissertation at Brown University, Providence, Rhode Island, 2007.*

Gedik et al.; SPADE: The System S Declarative Stream Processing Engine; Jun. 2008.*

Don Carney et al., Operator Scheduling in a Data Stream Manager, Proceedings of the 29th VLDB Conference, Berlin, Germany, 2003. (Year: 2003).*

Nesime Tatbul et al., Load Shedding in a Data Stream Manager, Proceedings of the 29th VLDB Conference, Berlin, Germany, 2003 . (Year: 2003).*

Emine Nesime Tatbul, Load Shedding for Data Stream Management Systems, Thesis/Dissertation at Brown University, Providence, Rhode Island, 2007. (Year: 2007).*

Ballard et al., "IBM InfoSphere Streams: Harnessing Data in Motion", Sep. 2010, 360 pages, IBM Redbooks. http://www.redbooks.ibm.com/abstracts/sg247865.html.

Gedik et al., "SPADE: The System S Declarative Stream Processing Engine," SIGMOD '08: Proceedings of the 2008 ACM SIGMOD International Conference on Management of Data, Jun. 2008, pp. 1123-1134.

Carney et al., "Operator Scheduling in a Data Stream Manager," Proceedings of the 29th VLDB Conference, Berlin, Germany, 2003, 12 pages.

Tatbul, E.N., "Load Shedding Techniques for Data Stream Management Systems," Dissertation for Degree of Doctor of Philosophy in the Department of Computer Science at Brown University, Providence, Rhode Island, May 2007, 150 pages.

Tatbul et al., "Load Shedding in a Data Stream Manager," Proceedings of the 29th VLDB Conference, Berlin, Germany, 2003, 12 pages.

Accelerated Examination Support Document dated Mar. 30, 2016 for U.S. Appl. No. 15/087,761 (U.S. Pat. No. 9,473,550), 11 pages.

Branson et al., "Multifusion of a Stream Operator in a Streaming Application," U.S. Appl. No. 15/427,927, filed Feb. 8, 2017.

List of IBM Patents or Patent Applications Treated as Related, signed Mar. 22, 2017, 2 pages.

* cited by examiner

MULTIFUSION OF A STREAM OPERATOR IN A STREAMING APPLICATION

CROSS-REFERENCE TO RELATED APPLICATIONS

This application claims the benefit of and is a Continuation of U.S. application Ser. No. 14/584,445, titled "MULTIFUSION OF A STREAM OPERATOR IN A STREAMING APPLICATION", filed on Dec. 29, 2014, which is a Continuation of U.S. application Ser. No. 14/276,015, titled "MULTIFUSION OF A STREAM OPERATOR IN A STREAMING APPLICATION", filed on May 13, 2014, all of which are hereby expressly incorporated by reference in their entireties for all purposes.

BACKGROUND

The present disclosure relates to stream computing, and in particular, to computing applications that receive streaming data and process the data as it is received.

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the present disclosure include a method, a system, and a computer program product for fusing a stream operator into more than one processing element within a streaming application.

One embodiment is directed toward a method for fusing a stream operator into more than one processing element within a streaming application. The method includes receiving an instruction to concurrently fuse, into a second processing element, a stream operator of interest that is fused into a first processing element. The method includes determining whether the stream operator of interest is stateful. The method includes compiling, in response to determining the stream operator of interest is stateful, a clone of the stream operator of interest into the second processing element so that the clone is synchronized with the stream operator of interest.

Another embodiment is directed toward a system for fusing a stream operator into more than one processing element within a streaming application. The system includes a compute node. The compute node hosts a first processing element and a second processing element. A stream operator of interest is fused into the first processing element. The system also includes a fusion manager that is configured to receive an instruction to concurrently fuse, into the second processing element, the stream operator of interest. The fusion manager is configured to determine whether the stream operator of interest is stateful. The fusion manager is configured to provide a clone instruction, in response to determining the stream operator of interest is stateful. The system also includes a compiler. The compiler is configured to compile, based on the clone instruction, a clone of the stream operator of interest into the second processing element. The clone is synchronized with the stream operator of interest.

Yet another embodiment is directed toward a computer program product.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
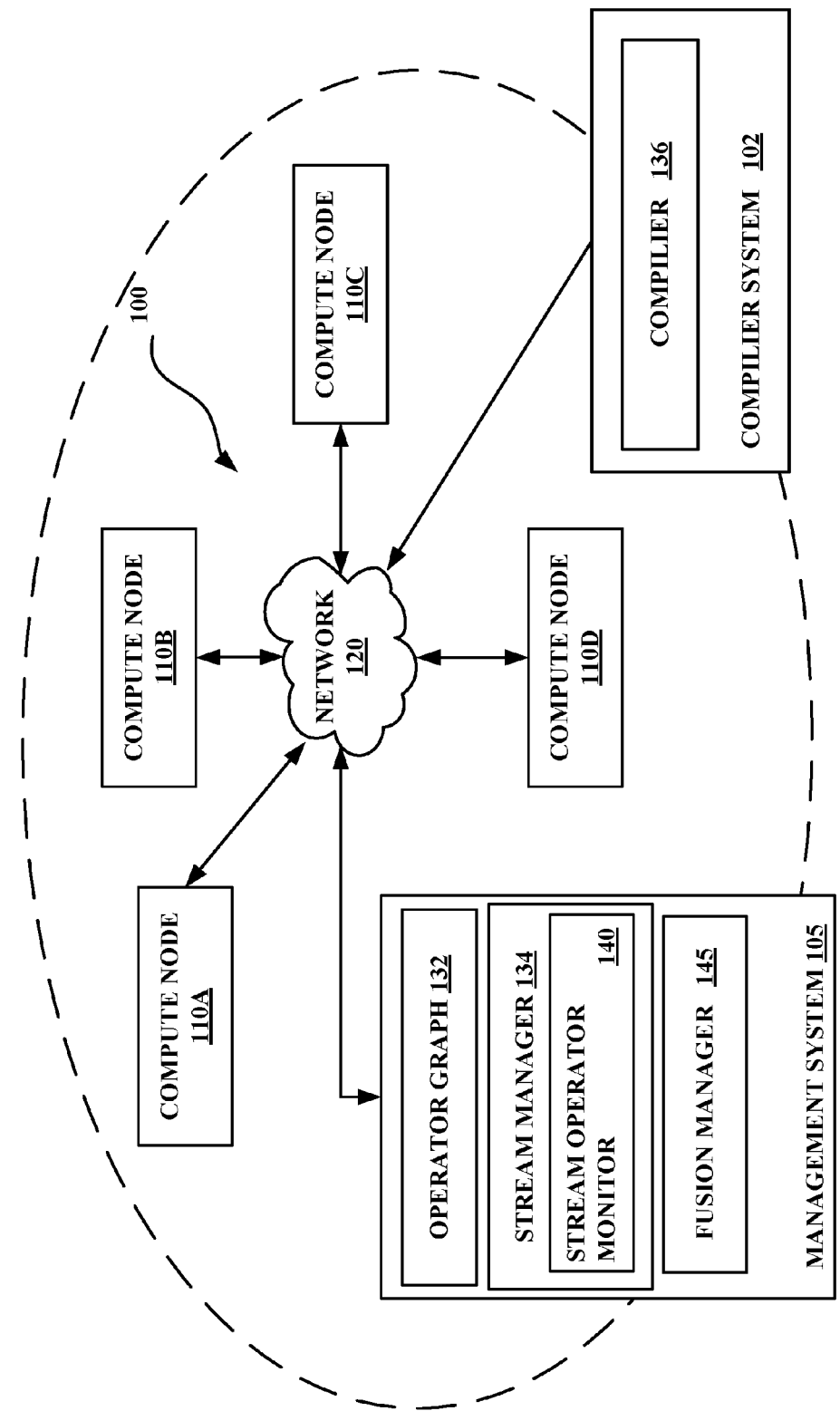
FIG. 1 illustrates a computing infrastructure configured to execute a stream computing application according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure relates to stream computing, and in particular, to computing applications that receive streaming data and process the data as it is received. For instance, a processing element can ordinarily be configured to contain a stream operator of interest from an operator graph. The stream operator of interest receives the data and processes the data as it is received. One or more stream operators are fused to one processing element. In a multi-fusion operation, the stream operator of interest is fused into a plurality of processing elements and the computing performance of a stream operator of interest can be improved.

A stream operator of interest can be fused by more than one processing element by creating a clone of the stream operator of interest and fusing the clone within another processing element. Aspects of the present disclosure also provide for a synchronization mechanism between the stream operator of interest and the clone. The clone can be a copy of the stream operator of interest that inherits the various dependencies and methods of the stream operator of interest. While the present disclosure is not necessarily limited to such applications, various aspects of the disclosure may be appreciated through a discussion of various examples using this context.

A virtual resource refers to resources that are distributed to virtual machines. Virtual resources can include computational resources such as CPU access, memory, network bandwidth, storage but can also include export regulations and encryption. For example, if an export regulation is used, then the geographic location of a server can be a virtual resource. The number of virtual machines that be hosted by servers based in a particular country may be restricted.

Although not necessarily limited thereto, embodiments of the present disclosure can be appreciated in the context of streaming data and problems relating to cloning stream operators into separate processing elements. Throughout this disclosure, the term template elements can generically refer to a processing element or a stream operator used in a template. Abbreviations used can include "S.O." or "OP" for stream operator, and P.E./PE for processing element, and VM for virtual machine.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

An operator graph can be an execution path for a plurality of stream operators to process a stream of tuples. In addition to stream operators, the operator graph can refer to an execution path for processing elements and the dependent stream operators of the processing elements to process the stream of tuples. Generally, the operator graph can contain a plurality of stream operators that produce a particular end result, e.g., calculate an average.

FIG. 1 illustrates one exemplary computing infrastructure 100 that may be configured to execute a stream computing application, according to some embodiments. The computing infrastructure 100 includes a management system 105 and two or more compute nodes 110A-110D—e.g., hosts or a resource/partition in a cloud computing environment—which are communicatively coupled to each other using one or more communications networks 120. The communications network 120 may include one or more servers, networks, or databases, and may use a particular communication protocol to transfer data between the compute nodes 110A—110D.

A compiler system 102 may be communicatively coupled with the management system 105 and the compute nodes 110 either directly or via the communications network 120. The compiler system 102 can further include a compiler 136. The compiler 136 is responsible for forming the communication links between the processing elements and between the stream operators. The compute nodes 110A-110D can be a hardware resource that supports the operation of the processing of the stream of tuples. The compute nodes 110A-110D can also be the hardware resources for a cloud computing environment. As discussed herein, the compute nodes 110A-110D can also be the virtualization platform for virtual machines.

Figure 3:
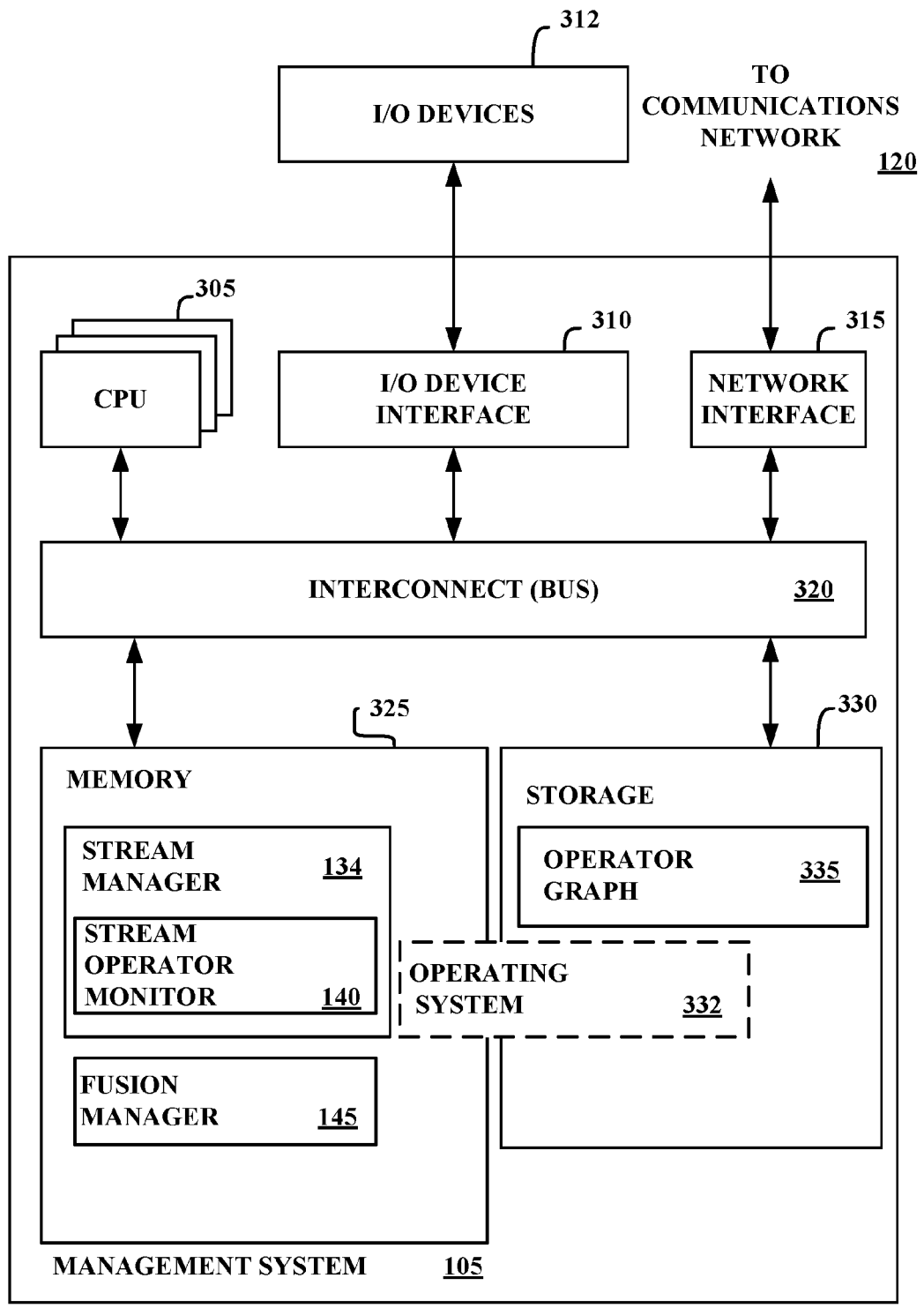
FIG. 3 illustrates a more detailed view of the management system of FIG. 1 according to various embodiments.

The management system 105 can control the management of the compute nodes 110A-110D (discussed further on FIG. 3). In various embodiments, the management system 105 is a compute node configured to be running stream management software. The management system 105 can have an operator graph 132 with one or more stream operators and a stream manager 134 to control the management of the stream of tuples in the operator graph 132. The stream manager 134 can manage the processes from the operator graph, including anything associated with the operator graph 132. The stream manager 134 can include a stream operator monitor 140 that monitors the stream operators in the operator graph for particular metrics. The management system 105 can also include a fusion manager 145 that communicates instructions to the compiler 136. For example, the fusion manager 145 can receive a performance metric for a stream operator from the stream manager 134 and make the determination on whether to recompile the operator graph 132. In various embodiments, the fusion manager 145 can communicate instructions to modify the fusing of processing elements with the compiler 136. The fusion manager 145 can be located in the stream manager 134 or the management system 105.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
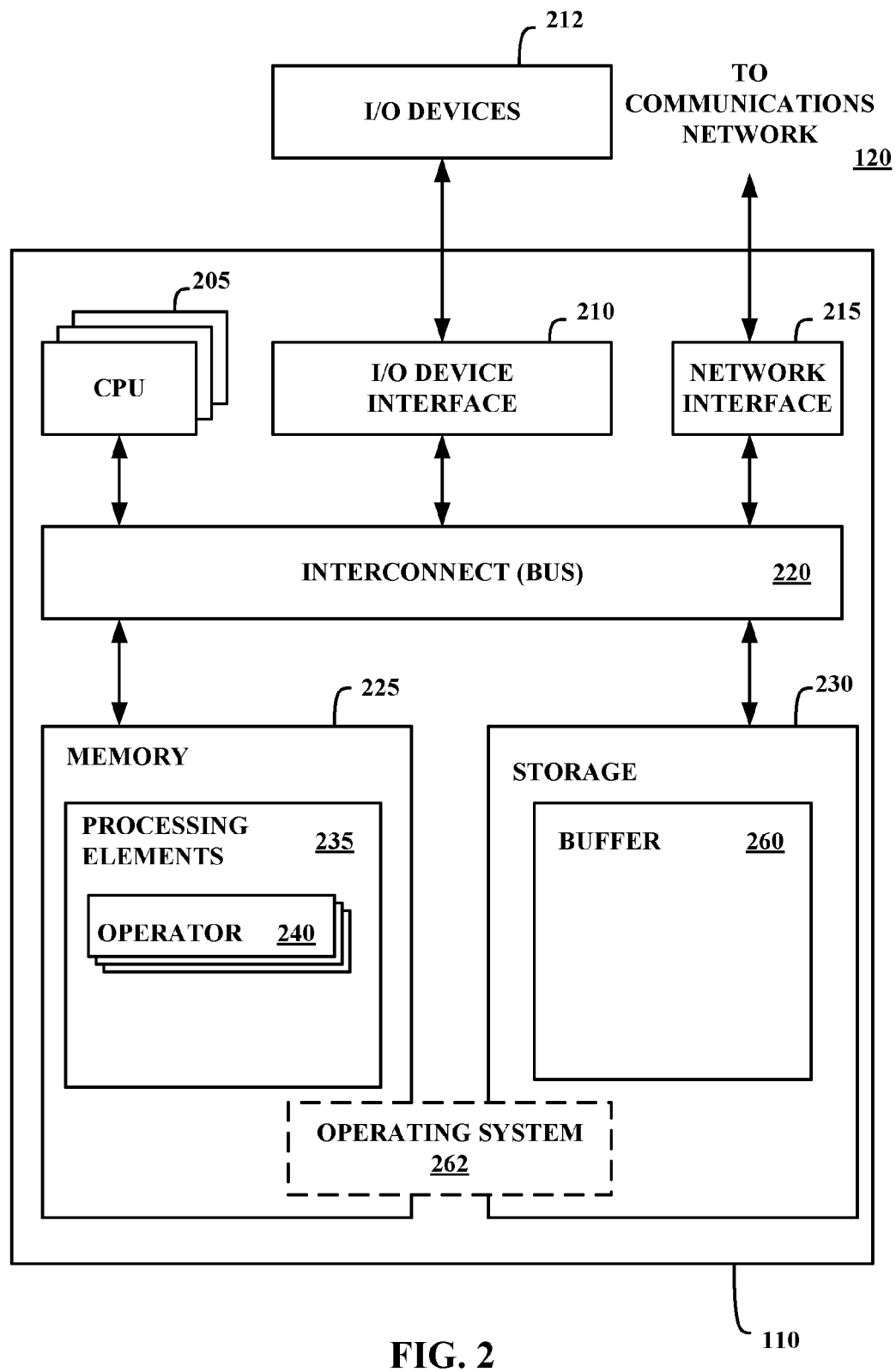
FIG. 2 illustrates a more detailed view of a compute node of FIG. 1 according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A compute node 110 can be configured to have a hypervisor 245. The hypervisor 245 can be configured to distribute the hardware elements, e.g., the CPUs 205, the memory 225, the storage 230, to the virtual machines 250. The hypervisor 245 can run as a separate program or be imbedded into the firmware of the compute node 110. The virtual machine 250 can replicate the experience of a standalone compute node to a variety of users without degrading performance. Due to spikes in demand, the hypervisor 245 can be configured to dynamically distribute the hardware resources to the virtual machine where the hardware resources of the compute node are most demanded.

A stream computing application may include one or more stream operators 240 that may be compiled into a "processing element" container 235. Two or more processing elements 235 may run on the same memory 225, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. The stream manager 134 can have software features that manage the stream of tuples through operator graph 335. The stream manager 134 can also perform aspects of the disclosure. For example, the stream manager 134 can modify the operator graph 335 to increase or decrease threads between stream operators. The stream manager 134 can include a stream operator monitor 140 to monitor the performance of a stream operator and collect metrics within the operator graph 335. The memory 325 may also store a fusion manager 145. The fusion manager 145 can optionally be part of the stream manager 134. The fusion manager 145 communicates with the stream manager 134 and the compiler to determine whether the stream operator of interest can have a multi-fusion operation performed.

According to various embodiments, an operator graph 335 can run in memory 325 and the corresponding data tuples 340 can be processed and stored in databases associated with the storage element 330. The stream manager 134 can also require a database when reading or writing from storage 330 and logging from storage 330.

Additionally, the storage 330 may store an operator graph 335. The operator graph 335 may define how tuples are routed to processing elements 235 (FIG. 2) for processing.

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
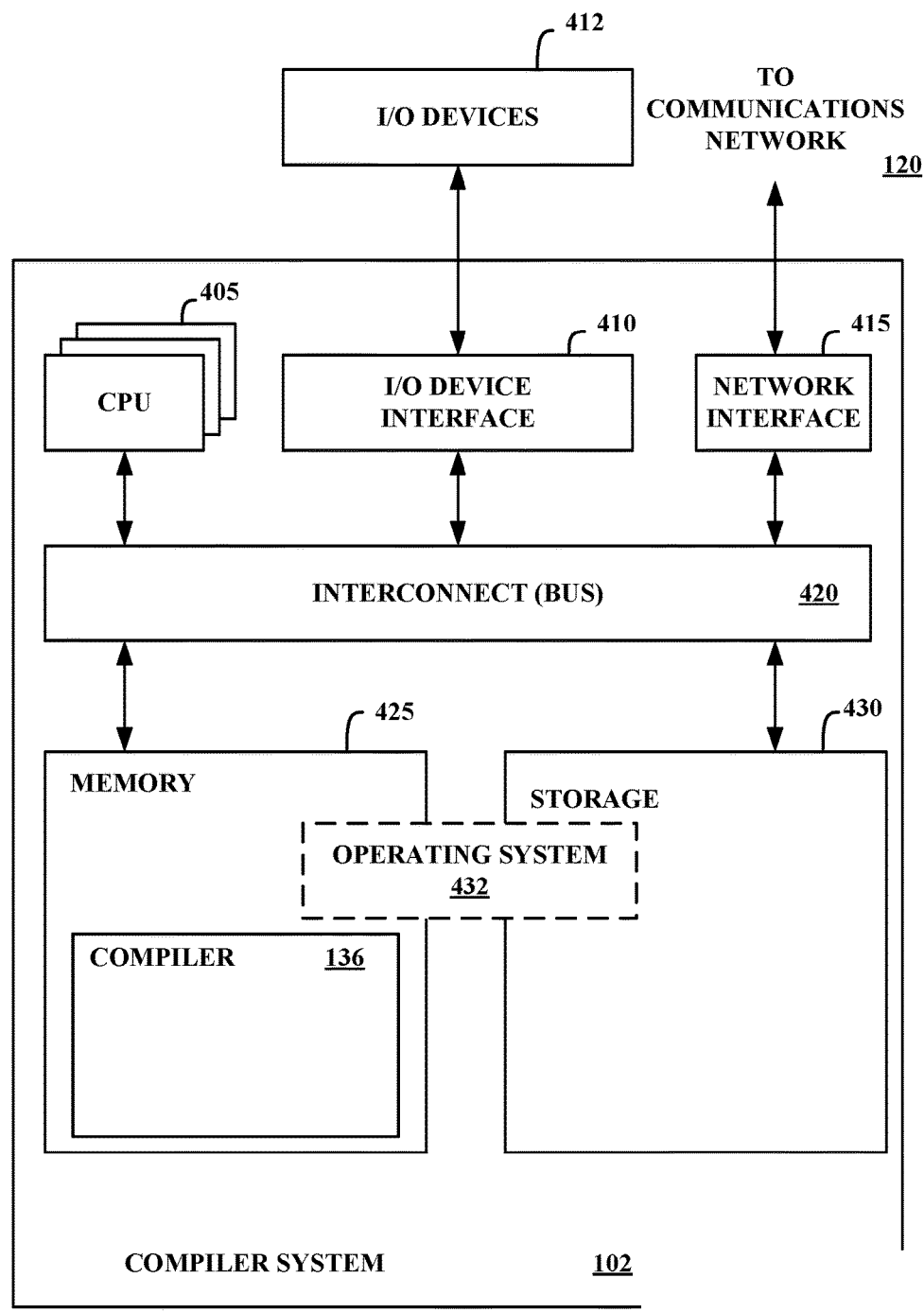
FIG. 4 illustrates a more detailed view of the compiler system of FIG. 1 according to various embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 335.

The compiler 136 may also communicate with a fusion manager from the management system to provide the application administrator with the ability to optimize performance through profile-driven fusion optimization. Any decision to fuse operators requires balancing the benefits of distributing processing across multiple compute nodes with the benefit of faster inter-operator communications. The compiler 136 may automate the fusion process through the fusion manager in the management system to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
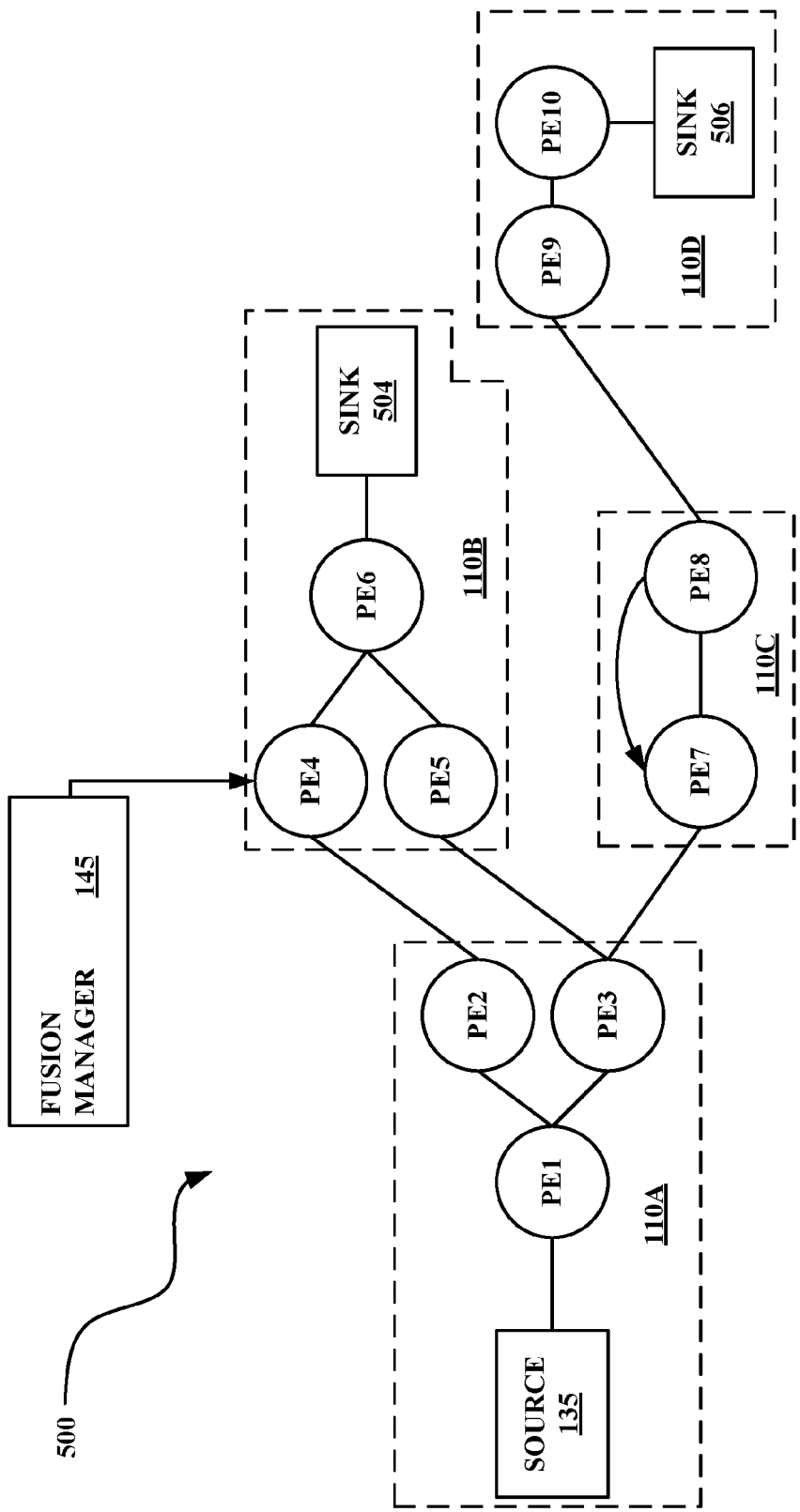
FIG. 5 illustrates an operator graph for a stream computing application according to various embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. The operator graph 500 may be comparable to the operator graph 132 in FIG. 1. In various embodiments, the operator graph 132 in FIG. 1 represents the management of the operator graph 500. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B Likewise, the tuples output by PE4 flow to PE6 and sink 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to PE10 and further processed by operators in a sink processing element 506.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

The operator graph 500 can communicate with the stream manager. The stream manager manages the flow of tuples within the operator graph 500. The stream manager may further communicate with a fusion manager 145. The fusion manager 145 may be responsible for managing the fusing of stream operators into a processing element and performing aspects of the present disclosure. The fusion manager 145 may communicate multi-fusion instructions to a compiler.

Figure 6:
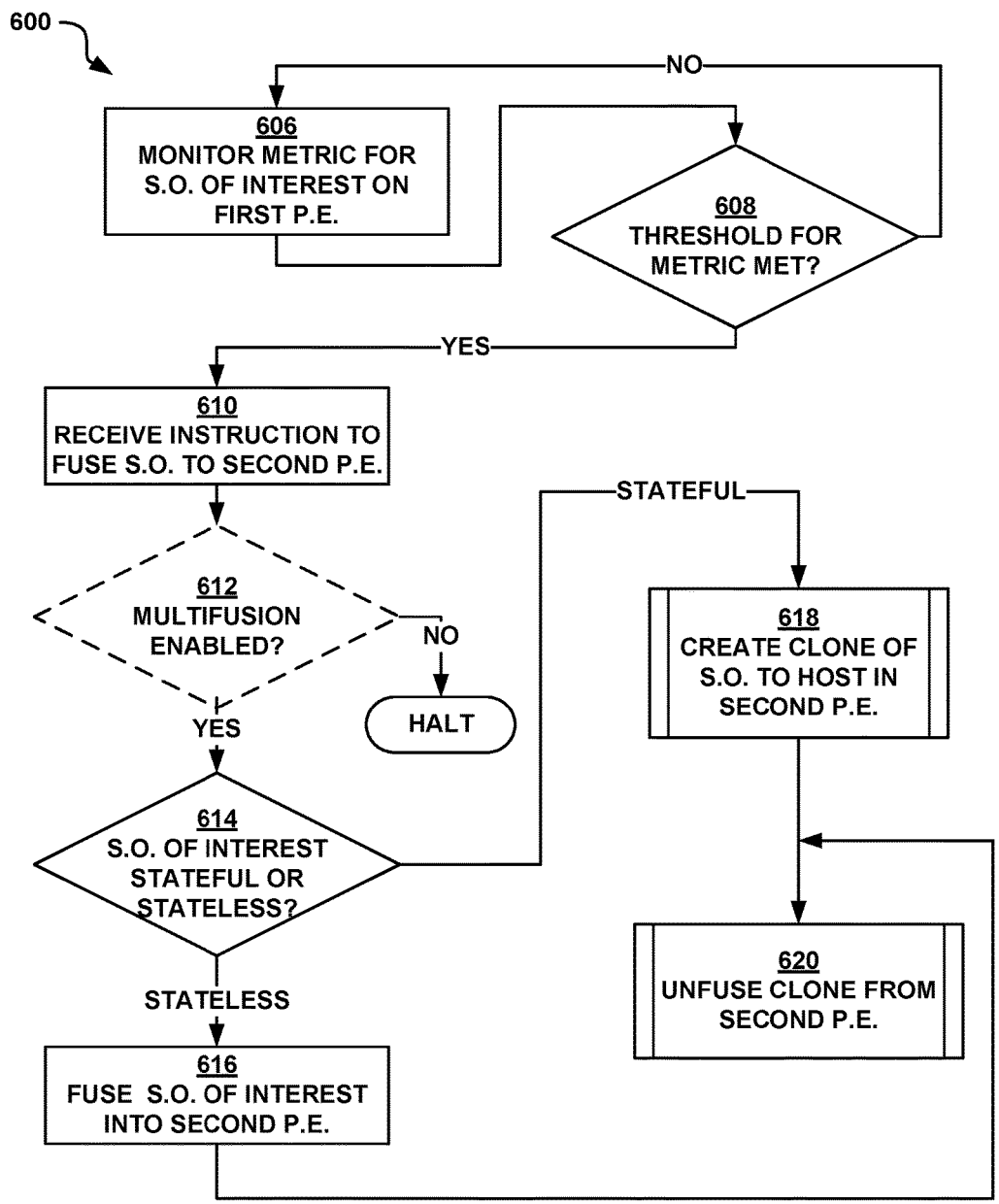
FIG. 6 illustrates a flowchart of a method for fusing a stream operator to more than one processing element, according to various embodiments.

FIG. 6 illustrates a flowchart of a method 600 for fusing a stream operator to more than one processing element, according to various embodiments. In various embodiments, the fusion manager may determine how to fuse different stream operators based on the readings from the stream operator monitor in the stream manager and transmit instructions to a compiler to reconfigure an operating graph. The method 600 begins at operation 606.

In operation 606, the stream operator monitor can monitor a performance metric for a stream operator of interest. The performance metric is a measurement that indicates the performance for a specific stream operator. The performance metric can be relative and based on performance relative to another stream computing component, e.g., a percent memory usage of the processing element. The performance metric can also be absolute, e.g., based on a non-relative measurement such as tuples/second. Once the stream operator monitor monitors the performance metric on the stream operator of interest, then the method 600 continues to operation 608.

In operation 608, the stream manager can determine whether the threshold for the performance metric is met. The threshold mirrors the performance metric. For example, if the performance metric is a percent processing capacity of the processor on the compute node, then the threshold is measured based on a percent processing capacity of the processor on the compute node. The threshold represents a metric that, if surpassed, will trigger the fusing of the stream operator of interest on a second processing element that is additional to the first processing element. Thus, if the performance metrics are too high on the first processing element, then an additional processing element can be used to fuse into the stream operator of interest.

In various embodiments, the threshold for the performance metric may be met when the performance metric is greater than or equal to the threshold. For example, if the performance metric for the stream operator of interest is 60 tuples/second and the threshold is 60 tuples/second, then the performance metric would be met. If the performance metric is 50 tuples/second, then the performance metric would not be met. The threshold may be met when the performance metric is less than the threshold. For example, if the threshold for danger for the stream operator of interest is 90% memory utilization, then the stream operator of interest could shut down. If the performance metric is 60% memory utilization, then the threshold would be met.

If the performance metric is met, then the method 600 continues to operation 610. If the threshold for the performance metric is not met, then the method 600 continues to operation 606. In various embodiments, if the threshold is met, then the stream manager can provide an instruction to fuse the stream operator of interest into the second processing element. In various embodiments, the instruction to fuse is provided to a compiler by the fusion manager.

In operation 610, the fusion manager receives the instruction. The fusion manager may be a preprocessing manager to determine how a processing element gets compiled. In various embodiments, the fusion manager may also be part of both the stream manager and the compiler. The instruction to fuse is an instruction that, when received by the fusion manager, causes the fusion manager to determine how to fuse the stream operator of interest into the second processing element. According to various embodiments, the fusion manager can receive an instruction to concurrently fuse, into a second processing element, a stream operator of interest that is fused into a first processing element. In various embodiments, the instruction to fuse can be a fusion instruction.

The fusion manager can receive the instruction to fuse a stream operator of interest to a second processing element at run-time via the stream manager or during development time via a developer or user. If the instruction is received at development time, then the developer of an application can initiate the fusion instruction for the fusion manager that enables the fusing or embedding of the stream operator of interest into more than one processing element. Thus, the development-time optimization can be controlled by the developer. The instruction can be received at run-time if triggered by the stream manager in operation 606 and operation 608. Once the fusion manager receives the instructions, then the method 600 continues to operation 612.

In operation 612, the fusion manager determines whether multi-fusion is enabled. In various embodiments, the multi-fusion is enabled by virtue of the fusion manager being active to receive the instruction in operation 610. Operation 612 may be optional or may occur prior to operation 610. If multi-fusion is not enabled, then the method 600 halts. The received instruction in operation 610 is disregarded. If multi-fusion is enabled, then the method 600 continues to operation 614.

In operation 614, the fusion manager determines whether the stream operator of interest is stateful. The term stateful can describe when information about previous data packets received in a prior stream operator is stored for some amount of time after those packets/tuples is processed. The information from previous data packets can be used to affect the processing in the current stream operator. A stateful stream operator includes a stream operator that depends on data from earlier tuples than the one being processed. For example, if a first stream operator performs an aggregating function on the stream of tuples, then the aggregator would be stateful because it will use a set of tuples in the aggregation, i.e., the current tuples plus some number of earlier tuples. Another example of a stateful operator includes a counting operator because the counting operator relies on the number of tuples that have already been processed at any point in time. If the fusion manager determines that the stream operator of interest is stateful, then the method 600 continues to operation 618.

The term stateless can describe when the stream operator will have no information about the previous data packets/tuples. For example, if the stream operator is receiving unprocessed data without regard to prior processes, then the stream operator is stateless. If the fusion manager determines that the stream operator of interest is stateless, then the method 600 continues to operation 616.

In operation 616, the fusion manager can communicate to the stream manager to fuse the stream operator of interest into the second processing element in response to the stream operator of interest being stateless. The stream operator of interest can be fused to the second processing element at run-time without compiling the operator graph. Since the stream operator of interest is stateless, then the stream operator of interest is not dependent on the output of other stream operators and can be fused into a second processing element. Once the stream operator of interest is fused into the second processing element, then the method 600 continues to operation 620.

In operation 618, the fusion manager can send an instruction to the compiler to compile a clone of the stream operator of interest into the second processing element. The clone of the stream operator of interest is synchronized with the stream operator of interest using a number of configurations described further herein. The clone of the stream operator of interest shares data with the stream operator of interest in a variety of techniques described further herein. In various embodiments, the stream of tuples in the operator graph will need to be stopped while the clone is being compiled. Once the clone is created, then the multi-fusion operation is completed and the method 600 continues to operation 620.

In operation 620, the fusion manager can receive the data from the stream manager regarding the stream operator of interest and the clone and determine whether to unfuse the clone from the second processing element. During the unfuse, the second processing element-clone relationship can be eliminated by recompilation of the second processing element. The unfusing operation is discussed further herein.

Figure 7:
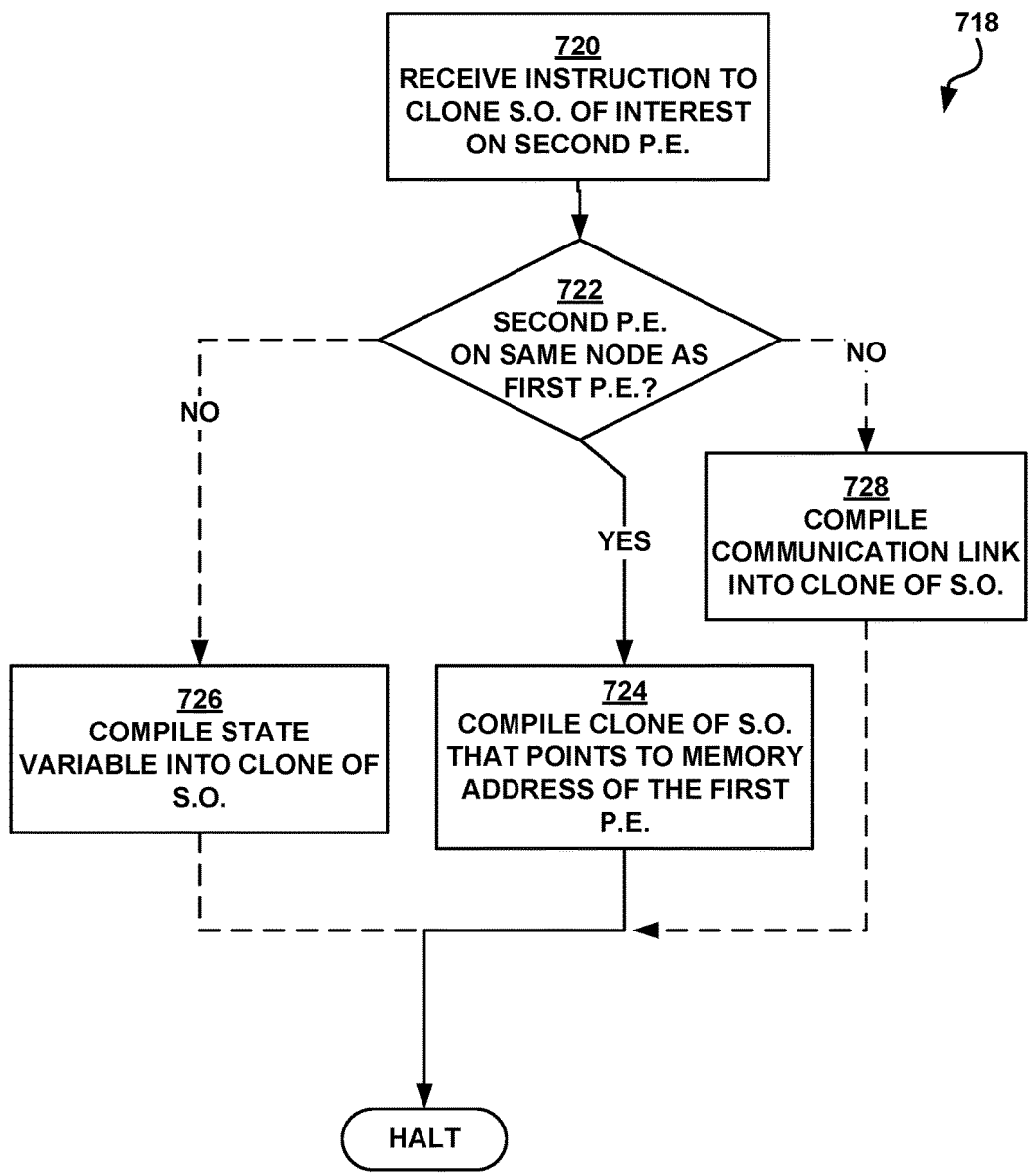
FIG. 7 illustrates a flowchart of a method of cloning a stream operator of interest, according to various embodiments.

FIG. 7 illustrates a flowchart of a method 718 of cloning a stream operator of interest, according to various embodiments. The method 718 may correspond to operation 618 from FIG. 6. In method 718, the compiler may receive a signal from the fusion manager to clone the stream operator of interest and compile the stream operator of interest based on whether the second processing element shares the same host as the first processing element. Method 718 may begin at operation 720.

In operation 720, the compiler receives an instruction to clone the stream operator of interest from the fusion manager. In various embodiments, the instruction to clone can be a clone instruction or a compile instruction. Once the compiler receives the instruction, then the method 718 continues to operation 722. In operation 722, the compiler can determine whether the second processing element is on the same compute node as the first processing element. In various embodiments, the stream manager determines whether the second processing element is on the same compute node as the first processing element and communicates to the fusion manager. The fusion manager determines that the compilation is to occur. If the second processing element is on the same compute node as the first processing element, then the method 718 continues to operation 724.

If the second processing element is not on the same compute node as the first processing element, then the method 718 continues to operation 726 or operation 728. According to various embodiments, the compiler can take a variety of predefined paths if the second processing element is not on the same node as the first processing element. The fusion manager can have a preference for either operation 726 or operation 728. In various embodiments, the preference is predefined. For example, the fusion manager may prefer that the second processing elements that are not on the same compute node as the first processing element be compiled using operation 726. The preference can be based on user preferences.

In various embodiments, both operation 726 and operation 728 can be used by the compiler if there are more than 2 processing elements with the stream operator of interest. For example, processing elements A, B, and C can contain the stream operator of interest. The stream operator of interest can be compiled on processing elements A and B using operation 726. The stream operator of interest can be compiled on processing elements B and C, and processing elements C and A using operation 728.

In operation 724, the compiler can compile the clone so that the clone and the stream operator of interest point to a memory address within the compute node. For example, if the first processing element and the second processing element are on the same host, and the first processing element has the stream operator of interest and the second processing element has the clone, then shared memory on the host/compute node can be used. In this configuration, the compiler of the streaming application would generate the proper code to keep the state in the shared memory and lock the shared memory appropriately as the shared memory is accessed. In various embodiments, the shared memory could be accomplished with pointers. Once the clone is compiled, then the method 718 halts.

In operation 726, the compiler can compile a state variable into each of the stream operator of interest and the clone that is maintained by a stream manager. The state variable can be compiled into the stream operator of interest and the clone but may be managed globally by the stream manager. Thus, when a change occurs, the state variable reflects the change. The state variable contains changes of state between the stream operator of interest and the clone. In various embodiments, the state variable are stored/accessed through runtime utilities and functions.

In operation 728, the compiler can compile a communication link between the stream operator of interest and the clone. The communication link facilitates communication of state changes between the stream operator of interest and the clone. In various embodiments, the communication link can be compiled by adding send and receive functions to each the stream operator of interest and the clone.

Figure 8:
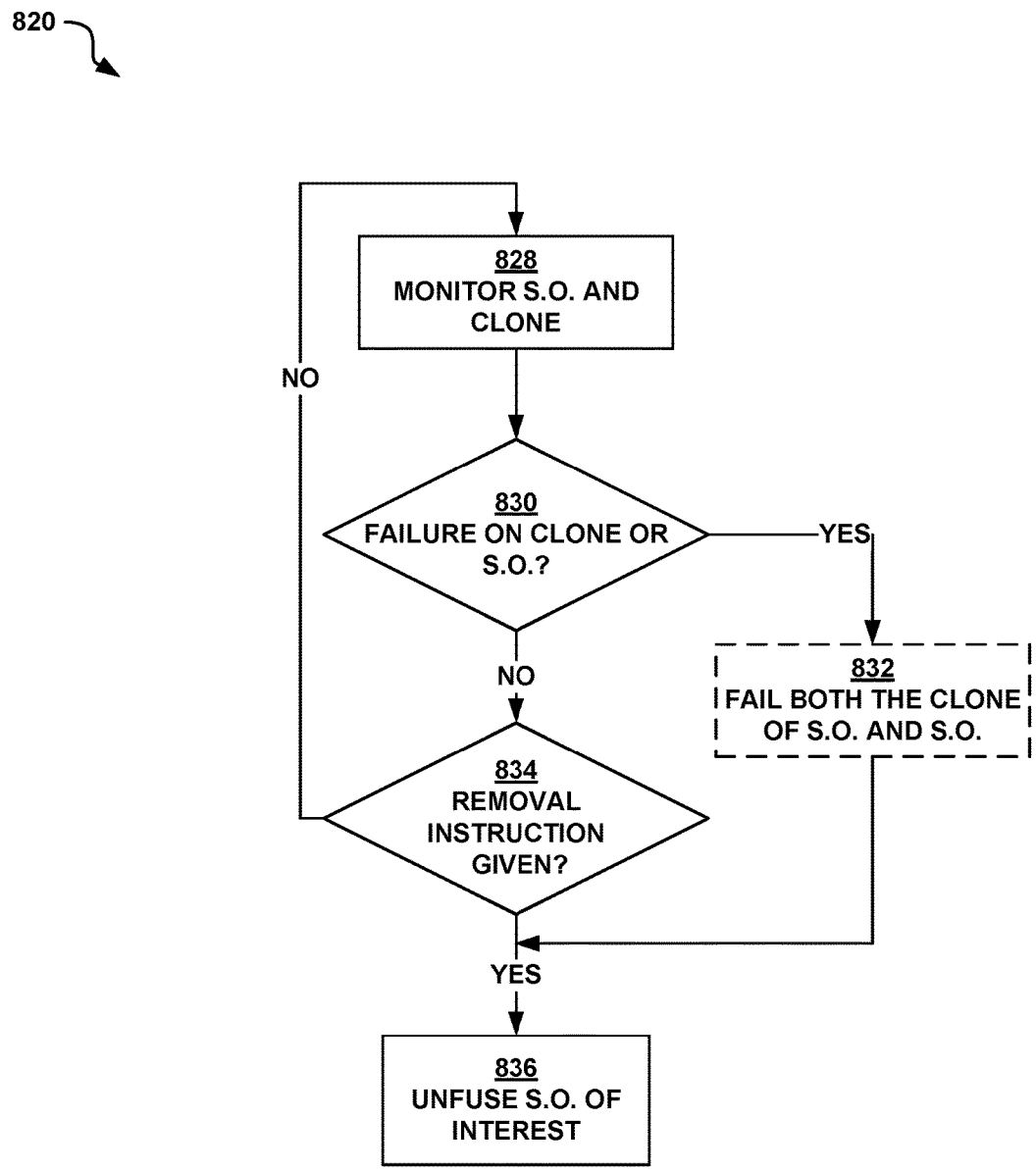
FIG. 8 illustrates a flowchart of a method for determining whether to unfuse the stream operator of interest or clone from the second processing element.

FIG. 8 illustrates a flowchart of a method 820 for determining whether to unfuse the stream operator of interest or clone from the second processing element. In various situations, the unfusing of the stream operator of interest can be beneficial in order to streamline the operator graph. For example, excess processing capacity as a result of the multi-fusion operation can be utilized by other parts of the operator graph. Unfusing can also occur when there is an error produced by a synchronization between a clone and a stream operator of interest.

The method 820 can involve the fusion manager monitoring the stream operator of interest and the clone for failures or removal instructions. The fusion manager can communicate and arrange the unfusing of the stream operator of interest from the second processing element. The method 820 can correspond to operation 620 in FIG. 6. The method 820 begins at operation 828.

In operation 828, the fusion manager can monitor the stream operator of interest and the clone. In various embodiments, the fusion manager can monitor the operator graph through data received from the stream manager. The fusion manager can also monitor the operator graph for performance metrics of any stream operator involved with the multi-fusion operation. The stream manager can also monitor the clone and stream operator of interest for performance metrics. In various embodiments, the stream manager can aggregate separate performance metrics for the stream operator of interest and the clone. The stream manager can further report the performance metrics to the fusion manager where the fusion manager makes determinations on whether to unfuse a stream operator of interest from the second processing element. Once the stream operator and the clone are monitored, then the method 820 continues to operation 830.

In operation 830, the fusion manager determines whether there is a failure on the clone or the stream operator of interest. A failure can be caused by a number of factors that would ordinarily fail a stream operator. In various embodiments, the failures can be tied to state. For example, receiving a corrupted or malicious tuple from a dependent stream operator can fail the stream operator. In other examples, a failure can be the result of a stream operator causing an exception, a tuple received that was not expected, or the compute node malfunctioning.

In various embodiments, the stream manager can communicate to the fusion manager that there is a failure on the stream operator of interest or the clone. If a failure is determined, then the method 820 continues to operation 832. If a failure is not determined, then the method 820 continues to operation 834.

In operation 834, the fusion manager can monitor whether a removal instruction is given. In various embodiments, the removal instruction can be provided by a user based on a determination that multi-fusion of the stream operator of interest is no longer necessitated by the performance metrics. The removal instruction can also be triggered automatically by a threshold analysis. For example, the removal instruction can be triggered by the stream manager if the performance metric is below a threshold, i.e., too low. If the removal instruction is provided in operation 834, then the method 820 can continue to operation 836. If the removal instruction is not provided, then the stream manager can continue monitoring for the removal instruction in operation 828.

In operation 832, the fusion manager can fail both the clone and the stream operator of interest in response to the presence of the failure of either the clone or the stream operator of interest. When both the clone and the stream operator of interest are failed, the fusion manager may immediately halt the processing on both the clone and the stream operator of interest.

In various embodiments, operation 832 may be considered optional depending on a failure policy. A user/developer can set various failure policies if the clone or the stream operator of interest fails. In one failure policy, the user can specify that a failure of either the stream operator of interest or the clone can fail both the stream operator of interest and the clone. The user can also specify that a failure of either the stream operator of interest or the clone does not cause the failure of the other. According to various embodiments, a removal instruction can be automatically provided in operation 834 if a clone of the stream operator of interest or the clone itself fails to function. The failure of the clone or the stream operator of interest can be a trigger to unfuse the stream operator of interest in order to maintain consistent data. After both the clone and the stream operator of interest are failed, then the method 820 continues to operation 836.

In operation 836, the fusion manager can unfuse the stream operator of interest from the second processing element. In various embodiments, the fusion manager can receive a removal instruction to remove the stream operator of interest. If the stream operator of interest is stateful, then the fusion manager provides instructions to the compiler to recompile the second processing element without the clone. If the stream operator of interest is stateless, then the stream manager can disassociate the stream operator of interest from the second processing element.

Figure 9A:
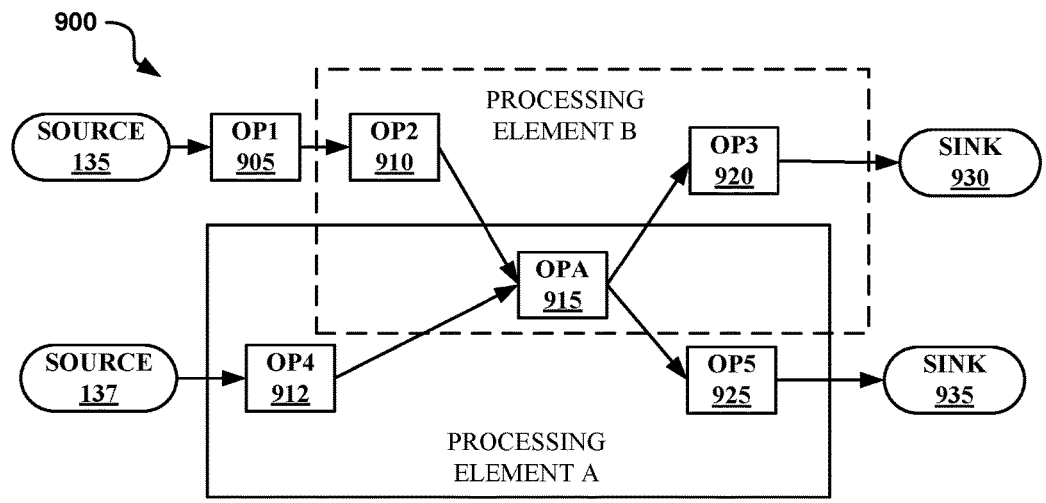
FIG. 9A illustrates a stateless embodiment of an operator graph in a multi-fusion configuration, according to various embodiments.

FIG. 9A illustrates a stateless embodiment of an operator graph 900 in a multi-fusion configuration, according to various embodiments. A first processing stream can originate at the source 135, be processed at stream operator OP1 905, stream operator OP2 910, stream operator OPA 915, stream operator OP3 920, and be transmitted to the sink 930. A second processing stream can originate at source 137, be processed at OP4 912, OPA 915, and OP5 925, and be transmitted to sink 935. The first and second processing stream can encounter a bottleneck at OPA 915. Tuples being processed from OP2 910 may wait for tuples to be processed from OP4 912 at OPA 915.

The stream operator of interest OPA 915 can receive streams of tuples from OP2 910 and OP4 912. In various embodiments, OPA 915 can be stateless. For example, in a tollbooth system application, OPA 915 can count the number of cars from a first tollbooth from the first processing stream, e.g., OP2 910, and the number of cars from a second tollbooth from the second processing stream, e.g., OP4 912.

Assuming that OPA 915 is stateless, then OPA 915 can be fused into both processing element A and processing element B. Processing element resources can be shared with the stream operator of interest, e.g., OPA 915. The multi-fusion operation can benefit the processing speed by allowing more processing bandwidth. For example, OP2 910, OPA 915, and OP3 920 can be served by one processing element without network delays. In various embodiments, the processing streams may be segregated and result in simultaneous processing of the first stream and the second stream.

Figure 9B:
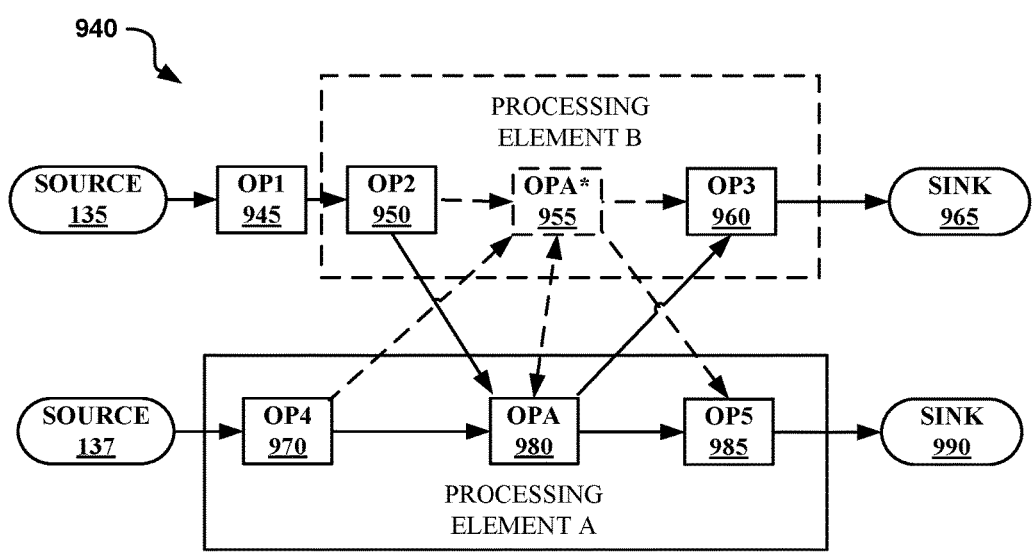
FIG. 9B illustrates a stateful embodiment of an operator graph in a multi-fusion configuration, according to various embodiments.

FIG. 9B illustrates a stateful embodiment of an operator graph 940 in a multi-fusion configuration, according to various embodiments. A first processing stream can originate at the source 135, be processed at OP1 945, OP2 950, OPA 980, OP3 960, and be transmitted to the sink 965. A second processing stream can originate at source 137, be processed at OP4 970, OPA 980, and OP5 985, and be transmitted to sink 990. Assuming that OPA 980 is stateful, then OPA 980 can be cloned. The first and second processing stream can encounter a bottleneck at OPA 980 and result in a clone of OPA 980, i.e., OPA* 955. For example, if OPA 980 aggregated data regarding a toll booth, and OP2 950 determines the number of red cars and OP4 determines the number of green cars, then OPA 980 can be cloned as OPA* 955.

OPA* 955 can be fused into processing element B while OPA 980 can be fused into processing element A. OPA* 955 can synchronize with OPA 980 by a variety of methods. For example, OPA* 955 and OPA 980 can both share a state variable that is managed by the stream manager. The state variable can be compiled into processing element B and processing element B to facilitate synchronization. For example, if OP2 950 determines the number of red cars and the OP4 970 determines the number of green cars, then when aggregating the red and green cars, OPA* 955 can receive the number of red cars from OP2 950 and OPA 980 can receive the number of green cars from OP2 950. OPA 980 and OPA* 955 can simultaneously share the information via the state variable with OPA 980.

In various embodiments, the state variable can be accessed by OPA 980 and OPA* 955 after every tuple received by either the stream operator of interest or the clone. The state variable can be written to by the stream operator of interest or the clone using a time-based window or a count-based window. For example, the state variable can be written to by OPA 980 every 4 milliseconds. In various embodiments, the operator graph 940 can provide for simultaneous writes.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for fusing one or more stream operators into one or more processing elements of a stream computing application, wherein the stream computing application resides on a compute node of a network, the method comprising:

receiving, at a fusion manager, an instruction to concurrently fuse, into a second processing element, a stream operator of interest that is fused into a first processing element, wherein the instruction to concurrently fuse the stream operator of interest into the second processing element is received at run-time via a stream manager and causes the fusion manager to determine how to fuse the stream operator of interest into the second processing element;

determining, by the fusion manager, whether the stream operator of interest is stateful;

when the stream operator of interest is stateful, the fusion manager sends a clone instruction to a compiler executing on a compiler compute node of the network;

compiling, by the compiler, in response to determining the stream operator of interest is stateful, a clone of the stream operator of interest into the second processing element so that the clone is synchronized with the stream operator of interest, by:
  determining, by the fusion manager, whether the first processing element and the second processing element are assigned to a same compute node; and
  compiling, by the compiler, in response to the first processing element and second processing element being assigned to the same compute node, the clone so that the clone and the stream operator of interest point to a memory address within the compute node,
  and in response to the first processing element and second processing element being assigned to different compute nodes,
    compiling, by the compiler, a state variable into each of the stream operator of interest and the clone that is maintained by the stream manager, wherein the state variable contains changes of state between the stream operator of interest and the clone;
  and compiling, by the compiler, the second processing element without the clone;
wherein said receiving the instruction to concurrently fuse the stream operator of interest into the second processing element is based on:
  monitoring, by the stream manager, a performance metric for the stream operator of interest in an operator graph, wherein the operator graph includes data flows between the one or more stream operators and defines how tuples are routed to the one or more processing elements;
  determining, by the stream manager, whether a threshold for the performance metric is met; and
    providing, by the stream manager, in response to the threshold for the performance metric being met, the instruction to fuse the stream operator of interest into the second processing element;

wherein the method further comprises:
  monitoring, by the stream manager, the clone and the stream operator of interest for a failure, wherein the failure is tied to a state;
    failing, by the fusion manager, both the clone and the stream operator of interest in response to a presence of the failure;
  when the stream operator of interest is stateless, the fusion manager fuses the stream operator of interest into the second processing element in response to the stream operator of interest being stateless; and
wherein the one or more processing elements includes the one or more stream operators fused together to form an independently running process; and
wherein the fusion manager and the stream manager are located on a management system and the compiler is located on the compiler compute node of the network separate from the management system.

2. The method of claim 1, further comprising:
when the stream operator of interest is to be removed, receiving, at the fusion manager, a removal instruction to remove the stream operator of interest.

3. The method of claim 1, further comprising:
compiling, by the compiler, in response to the first processing element and second processing element being assigned to different compute nodes, a communication link between the stream operator of interest and the clone, wherein the communication link facilitates communication of state changes between the stream operator of interest and the clone.

4. The method of claim 1, further comprising:
aggregating, by the stream manager, separate performance metrics for the stream operator of interest and the clone; and
reporting, by the stream manager, the separate performance metrics to the fusion manager.

\* \* \* \* \*